Feb. 1, 1966  D. H. POLZIN  3,232,626
MATERIAL DISTRIBUTOR
Filed Dec. 20, 1963  7 Sheets-Sheet 1
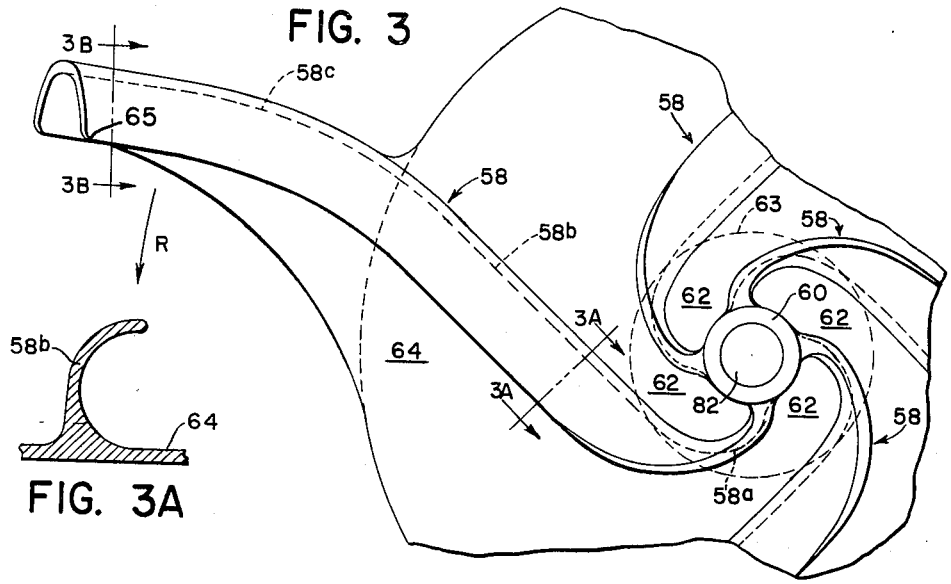
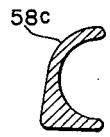
FIG. 3B
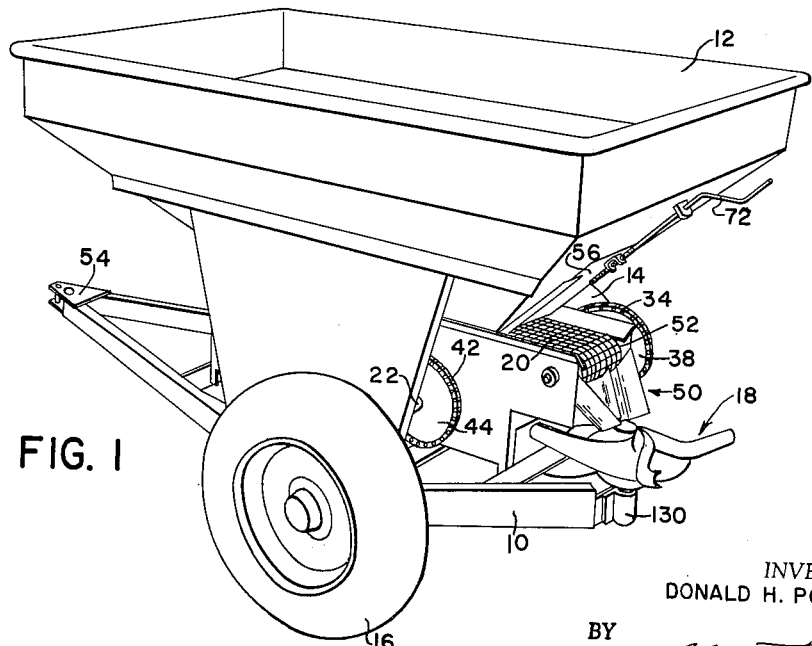
INVENTOR.
DONALD H. POLZIN
BY
*John C. Thompson*
ATTORNEY Feb. 1, 1966     D. H. POLZIN     3,232,626
MATERIAL DISTRIBUTOR Filed Dec. 20, 1963     7 Sheets-Sheet 2

INVENTOR.
DONALD H. POLZIN
BY
ATTORNEY

Feb. 1, 1966 D. H. POLZIN 3,232,626
MATERIAL DISTRIBUTOR
Filed Dec. 20, 1963 7 Sheets-Sheet 3

INVENTOR.
DONALD H. POLZIN
BY
*John C. Thompson*
ATTORNEY

Feb. 1, 1966 D. H. POLZIN 3,232,626
MATERIAL DISTRIBUTOR
Filed Dec. 20, 1963 7 Sheets-Sheet 4

INVENTOR.
DONALD H. POLZIN
BY *John C. Thompson*
ATTORNEY

Feb. 1, 1966   D. H. POLZIN   3,232,626
MATERIAL DISTRIBUTOR
Filed Dec. 20, 1963   7 Sheets-Sheet 5
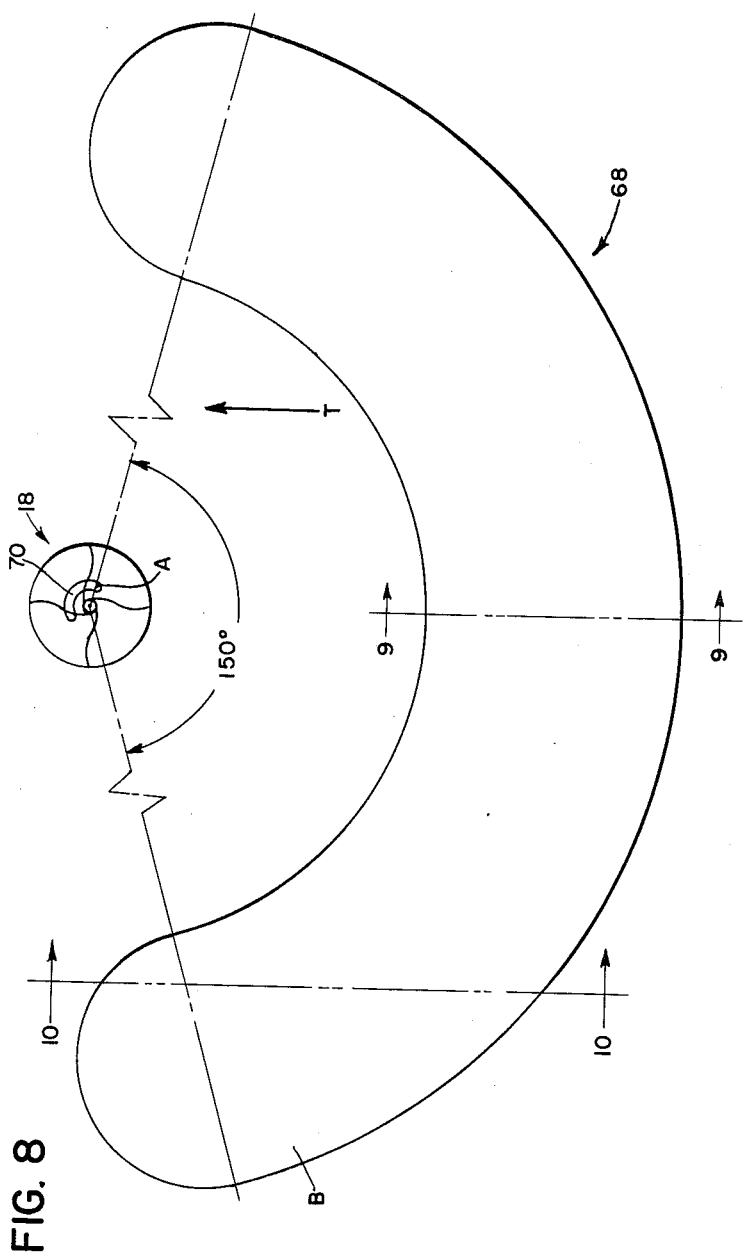
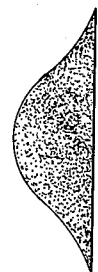
INVENTOR.
DONALD H. POLZIN
BY
ATTORNEY

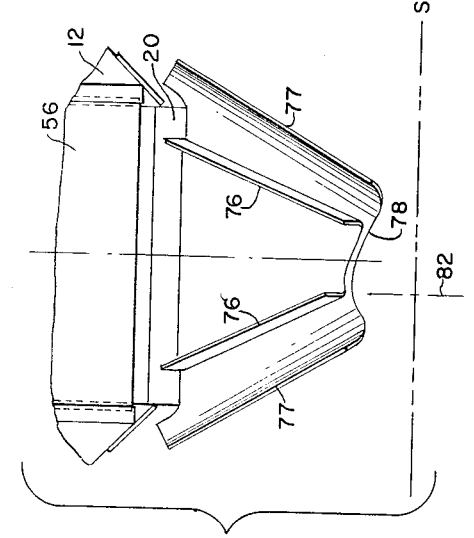
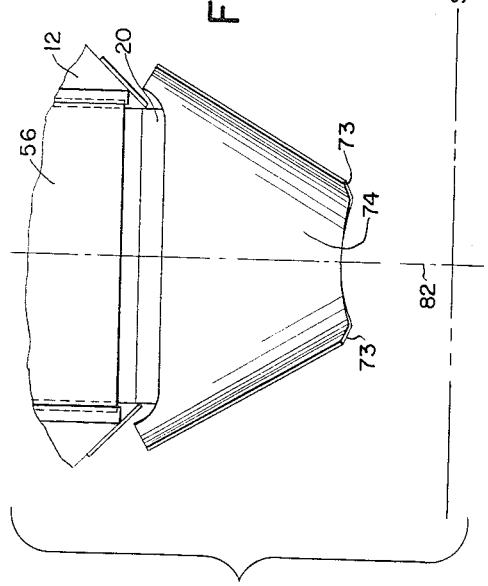
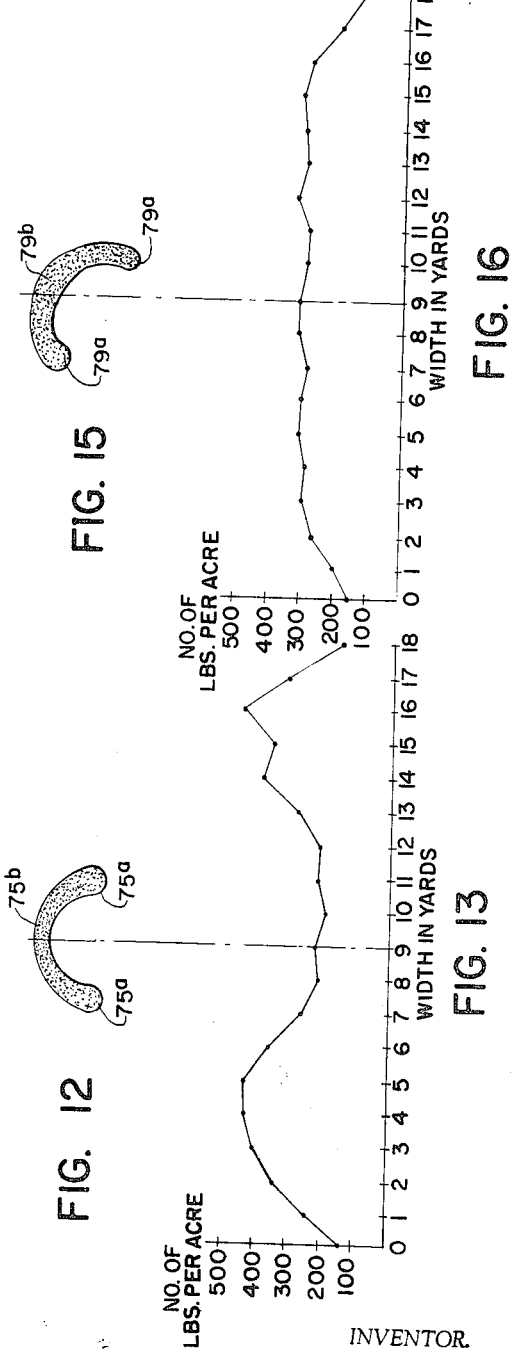

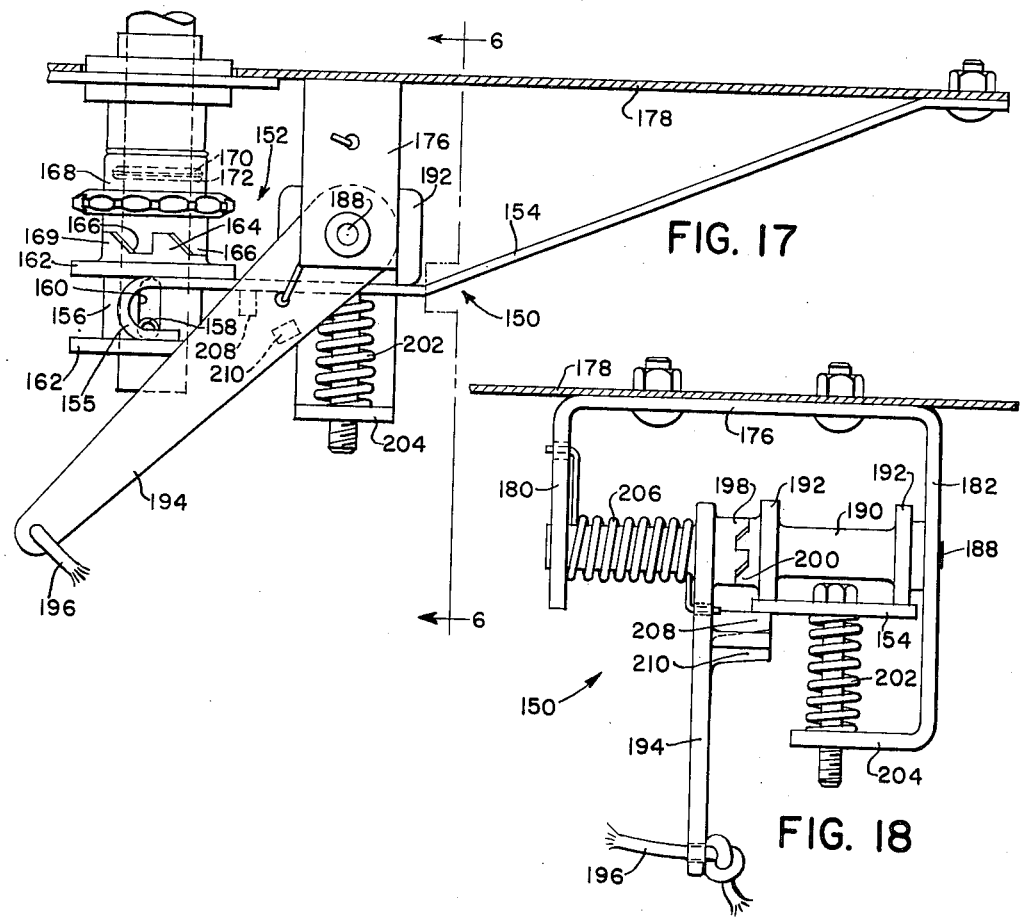
FIG. 17
FIG. 18
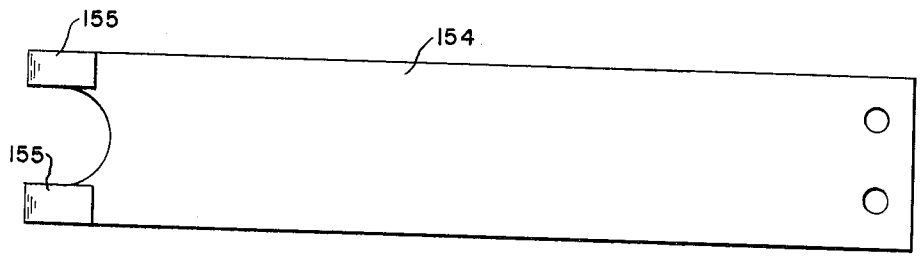
FIG. 19
INVENTOR.
DONALD H. POLZIN
BY
John C. Thompson
ATTORNEY

United States Patent Office 3,232,626
Patented Feb. 1, 1966

3,232,626
MATERIAL DISTRIBUTOR
Donald H. Polzin, Horicon, Wis., assignor to Deere & Company, Moline, Ill., a corporation of Delaware
Filed Dec. 20, 1963, Ser. No. 332,192
16 Claims. (Cl. 275—8)

The present invention relates generally to material distributors, and more particularly to broadcast spreaders adapted to be propelled forwardly over the surface of the ground and to discharge agricultural and other materials onto the ground.

It is a principal object of the present invention to provide an improved broadcast spreader having a spinner which broadcasts material deposited onto it, the broadcast spreader being of greater accuracy of placement and of lower cost.

A principal feature of the present invention is the provision of a governor controlled variable speed transmission in a spinner drive.

Prior art broadcast spinners have been either direct wheel driven or PTO shaft driven. When the tractor or tractor engine speed is reduced and the spinner is dependent upon ground or engine speed of the tractor, the width of spread is decreased because of the lower spinner speed. A second disadvantage of PTO spreaders is that not all farmers have PTO tractors. Thus it is an object of this invention to provide a ground driven spreader adapted to spread material at a constant width at various ground speeds.

A further object of the present invention is to provide an improved governor controlled variable speed transmission which is adapted to drive a broadcast spreader, the governor being provided with an improved weight construction to reduce sluggishness and lag in response to varying power inputs.

Another object of the present invention is to provide a spinner construction adapted to catch the falling particles to be distributed, change the direction of their movement and gently accelerate them outward and somewhat upward in a definite direction to a predetermined discharge point. More particularly it is an object of the present invention to provide a spinner having reverse "S" shaped curved blades that are cup-shaped in cross section, an inner portion of the blade being adapted to initially contact falling particles to be discharged in such a manner that the particles are initially gently accelerated downwardly and outwardly, the outer portion of the blade having a slight upward inclination and a reverse curve at the outer end to increase the velocity of the particles to be discharged and to give the discharged particles a slightly upward trajectory when discharged to provide increased spreading width consistent with accuracy of placement.

Another object of the present invention is the provision of means to discharge the particles to be spread onto the spinner in such a manner that the material discharged will be of relatively uniform density across the spreading width. More particularly it is an object of the present invention to provide a chute disposed below the rear end of a hopper conveyor that is adapted to convey a uniform depth of material across its width to its point of discharge, the chute being provided with sides that tend to funnel the material and inner gathering fins to collect material whereby more of the material is disposed near the center of the chute.

A further object of the present invention is to provide means for adjusting the spinner whereby different materials may be distributed with equal accuracy. It has been found in practice that various materials leave the spinner after varying degrees of rotation of the spinner. Thus slick materials such as grain will leave the spinner more rapidly than granular materials, and sticky, powdery materials leave the spinner less rapidly. Thus it is an object of the present invention to provide a spinner construction that can be shifted laterally from the center of the discharge whereby the spread pattern is maintained to the rear of the spreader with materials of different distribution natures.

A further object of the present invention is the provision of improved drive means for a ground driven broadcast spreader of the spinner type in which a conveyor is employed to carry the material to be broadcast to the spinner, the drive having one clutch means for placing the conveyor means into and out of engagement with the drive wheels, and second clutch means for connecting or disconnecting the drive means for both the spinner and the conveyor.

A further object of the present invention is to provide an improved conveyor clutch and throwout mechanism which can easily be thrown in or out of engagement while the machine is in forward motion.

These and other objects and advantages of this invention will be apparent to those skilled in the art after a consideration of the following detailed description, taken in conjunction with the accompanying drawings, in which the preferred form of this invention is illustrated.

FIG. 1 is a perspective view of the spreader of the present invention.

FIG. 3 is a plan view of the spinner of the present invention, and FIGS. 3A and 3B are sections taken along the lines 3A—3A and 3B—3B in FIG. 3.

FIG. 8 is a plan view of the typical spreading pattern, the spinner being shown in an enlarged scale with respect to the spreading pattern.

FIGS. 9 and 10 are sectional views taken through the discharged materials on the lines 9—9 and 10—10 of FIG. 8.

FIG. 11 is a rear view of a prior art chute associated with a material conveyor.

FIG. 12 is a section of the material as it hits the spinner when the material is discharged from the prior art chute.

FIG. 13 is a graph showing the distribution pattern of a prior art spreader.

FIG. 14 is a rear view of a chute employing the gathering fins of applicant's invention shown associated with a material conveyor.

FIG. 15 is a section of the material as it contacts the spinner when the material is discharged from the novel chute illustrated in FIG. 14.

FIG. 16 is a graph showing the spreading pattern of material discharged from applicant's spinner when the material is received from applicant's discharge chute.

FIG. 17 is a top view of the conveyor clutch and throwout assembly.

FIG. 18 is a side view of the throwout mechanism.

FIG. 19 is a view showing the lever which interconnects the throwout mechanism with the clutch.

In the following description right-hand and left-hand reference is determined by standing to the rear of the broadcast spreader and facing the direction of travel.

In general

Figure 2:
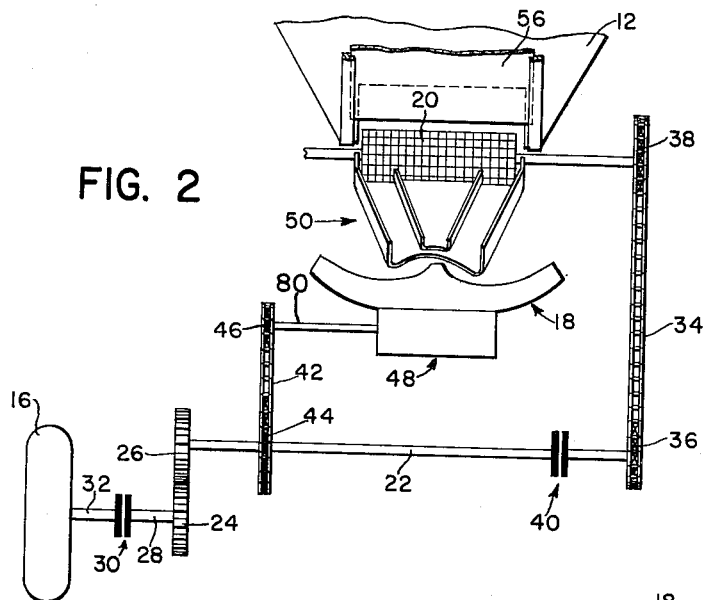
FIG. 2 is a schematic rear view of the drive system for applicant's spreader.
Figure 7:
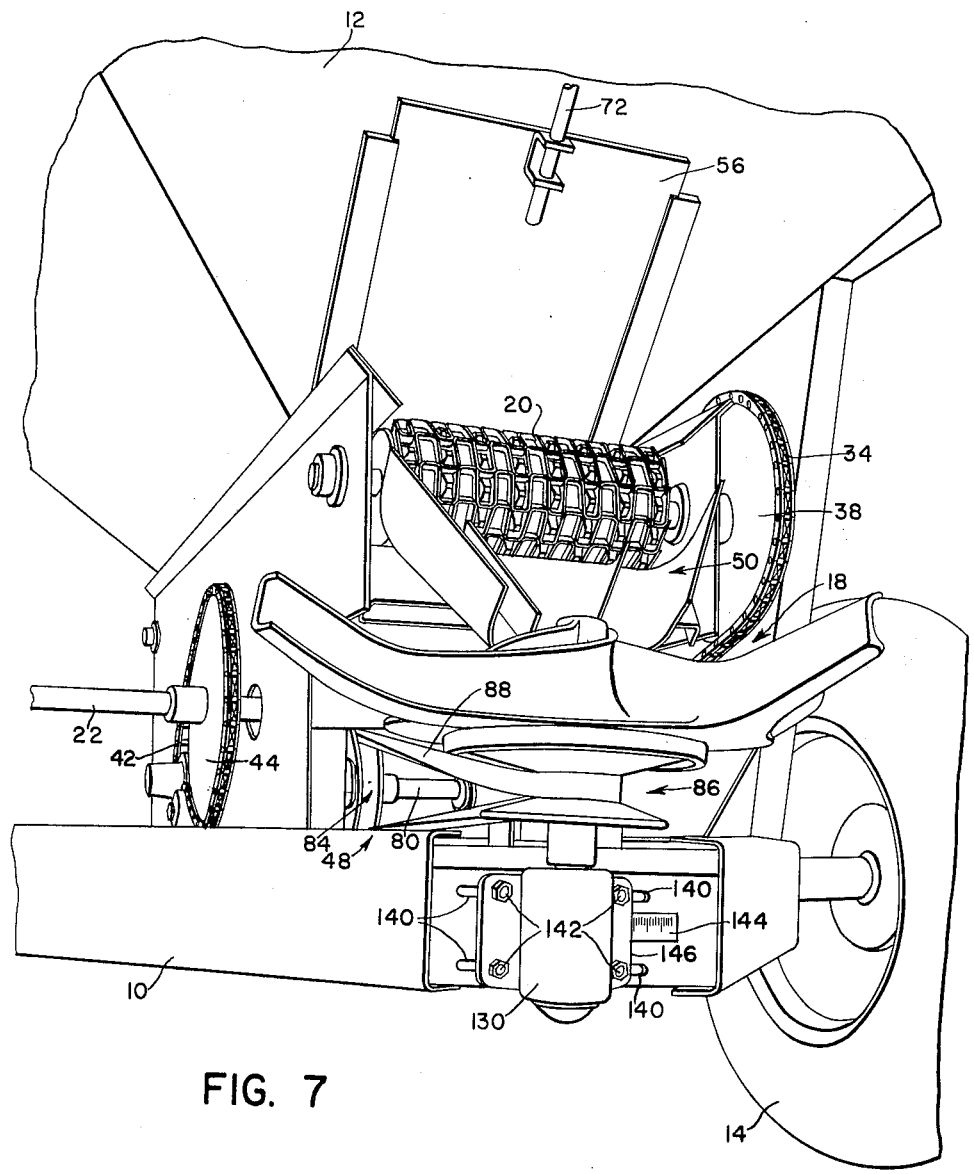
FIG. 7 is an enlarged perspective view taken of the rear portion of applicant's machine.

The broadcast spreader of the present invention, as best shown in FIGS. 1, and 7, and schematically in FIG. 2, includes a frame or chassis 10 having mounted thereon a material hopper 12. The chassis is supported by right- and left-hand wheels, 14 and 16, respectively; the left-hand wheel 16 being adapted to drive a spinner 18 and a chain belt conveyor 20 in the bottom of the hopper 12. To this end, the wheel 16 is drivingly interconnected to a jackshaft 22 through gears 24, 26, drive member 28, and a ratcheting clutch assembly 30 on the axle 32. The jackshaft 22 is in turn connected through chain 34, sprockets 36, 38, and a clutch and throwout assembly, indicated generally at 40, with the chain belt conveyor; and the jackshaft 22 is also connected through chain 42, sprockets 44, 46, input shaft 80, and a governor controlled variable speed transmission 48 to the spinner 18. Disposed between the apron 52 of the conveyor 20 and the spinner 18 is a chute 50.

Operation

To operate applicant's broadcast spreader it is only necessary to fill the hopper 12 with the material to be spread, to secure the nosepiece 54 of the frame or chassis 10 to any tractor or truck and to draw the spreader (with both clutches engaged) over the area to be spread, the gate 56 being opened to the desired amount.

Applicant's chute 50 and spinner 18 are so designed that the material to be discharged is deposited on the spinner in such a manner, and the spinner discharges the received material in such a manner, that as the spreader is drawn down a field the rate of application will be even across the field.

Spinner construction

Applicant's spinner is constructed in such a manner that it will receive a particle from the discharge chute 50, change its direction of movement, and discharge it in a predetermined trajectory. To this end, the spinner is provided with four cup shaped blades 58 (FIG. 3) extending outwardly from the hub 60 of the spinner. The bottom central portion 62 (that area within the broken line 63 in FIG. 3) of the spinner which initially receives the particle is somewhat conical in shape as can best be seen from FIGS. 4 and 5, and it can be seen that a falling particle which would contact this surface would not bounce upwardly as it would if the particle fell on a flat surface, but would in fact tend to slide radially outwardly and downwardly. Each of the blades is S-shaped and disposed in such a fashion that the portion 58a of the blade that tends to initially contact the particle to be discharged spirals away from the hub 60 in a direction opposite to the direction of rotation of the spinner indicated by the arrow R in FIG. 3. Thus the initial area 58a of the spinner will gently receive the particle to be discharged and slowly accelerate it downwardly and outwardly without batting the particle in a helter-skelter manner. The next portion 58b of the blade is substantially straight in plan (FIG. 3) and has a somewhat curved bottom 64 (FIGS. 4 and 5) and the particle to be discharged is generally uniformly accelerated along this portion.

Applicant has found that by providing a reverse curve 58c at the outer end of each spinner blade he can improve the accuracy of discharge and also the velocity of discharge, thus permitting a spread of greater width. The terminal portion of the blade is disposed at such an angle with respect to the radius passing through the tip 65 of the blade that that portion of the blade lying inwardly of the tip will be behind the radius line (with respect to the direction of rotation). To maintain relatively uniform acceleration, the entire length of the blades are smoothly curved.

As can clearly be seen from FIG. 3 the curved outer portion 58c has a radius of curvature greater than the radius of curvature of the inner portion 58a.

To further improve the width of spread the outer ends of the blades are angled upwardly as can best be seen from FIGS. 1 and 7.

To better control the flow of the material as it is accelerated outwardly, the blades are made cup shaped as can be seen from FIGS. 3A and 3B, the cup section at the outer ends having a smaller radius of curvature than radially inner portion of the blades as can best be seen from a comparison of FIGS. 3A and 3B.

Discharge chute

Applicant has found that an average granulated fertilizer particle deposited 1½" from the spinner axis, the spinner being constructed in the manner illustrated and described above and having a 22" diameter and operating at 500 r.p.m., that the particle will be discharged in a line that makes an angle of 220° with the line passing through the spinner axis and the deposit point. Thus a particle deposited on the spinner at A will be discharged onto the ground at point B. Tests have shown that this will happen with remarkable repetition. It therefore follows that a particle could be thrown in any direction merely by controlling the point at which it is deposited on the spinner. Likewise a definite spread pattern can be developed by placing an extremely large number of particles on the spinner in different positions at the same time.

It has been found that it is desirable to feed the material to the spinner in such a fashion that the material will be distributed in a kidney shaped pattern at a distance away from the spinner of approximately 150° in width as can be seen from FIG. 8. Thus, if the spinner rotates on its axis but the axis remains stationary, we find that a large kidney shaped pile of material 68 would soon accumulate if the material was fed onto the spinner in a column to the small kidney shaped deposit area shown at 70. FIG. 9 shows the cross sectional shape of the pile that would result. When the spinner is moved down the field the volume of the material deposited in each row running down the field could be proportionately represented by the longitudinal cross sectional area of the stationary kidney shaped pile, such as the cross sectional areas deposited along the lines 9—9 and 10—10 as shown in FIGS. 9 and 10 respectively. But the areas along the sections 9—9 and 10—10 are not the same even though sections identical to 9—9 could be taken at any place in the pile so long as the section plane passes through the spinner axis. This then points out one problem to be overcome, namely, that there will be a tendency for the rate of application to be higher to the sides and lower in the area behind the spinner. This condition is further aggravated by the common method used to funnel the material to the spinner.

The material to be spread is carried from the main hopper 12 on a conveyor 20. The height of the layer depends on the feed rate desired which is regulated by the amount that the gate 56 is opened, the gate being raised and lowered in a conventional manner by crank 72. In normal applications a relatively thin flat layer will be delivered to the chute. The chute must then condense this thin layer to the proper shape and deposit the material on the spinner. A chute generally similar to those of the prior art is illustrated in FIG. 11 and it can be seen that the sides 73 of the chute 74 will collect the material from the sides of the conveyor and move it towards, but not into, the center of the discharge. The inward movement of the particles will continue after they leave the chute until they contact the spinner, which is represented by the broken line S. The discharged material will have a volume proportional to the cross sectional area that contacts the spinner as shown in FIG. 12 and it can be seen that the thin condensed layer is heavier towards the sides 75a than it is at the center 75b. The spreading pattern which would result from the employment of a prior art chute is shown in the graph in FIG. 13 and it can be seen that much more material is deposited towards the sides than at the center.

To overcome the foregoing disadvantages of the prior art construction applicant has provided his discharge chute with gathering fins 76 which are disposed inwardly of the sides 77 of the chute 50. The gathering fins, as best shown in FIG. 14, will cause more material to be deposited near the chute center which will in turn cause more material to be discharged near the center of the kidney 68 and less near the ends, which will in turn cause the material to be spread evenly across the field as shown by the graph in FIG. 16.

The gathering fins are so disposed within the chute that they encompass a greater percentage of linear width at their upper ends than at their bottom ends. Thus in applicant's preferred embodiment they will collect in the neighborhood of 50% of the material as it comes from the conveyor and condense it in such a manner that its width at the point of discharge is approximately 30-35% of the total width of the discharged material. The material to be discharged has a somewhat curved eliptical shape when it contacts the spinner as shown in FIG. 15, and it can be seen that more material is deposited near the center 79b than at the sides 79a.

Applicant has found that the gathering fins 76 need not be as high as the sides 77 at high feed rates. Thus while the terminal portion of the discharge chute may be filled level with the top of the sides, it has been found that the spread rate is not heavy at the sides. The reason for this is probably that the material sliding down the sides tends to continue toward the center thus further condensing the material.

Since the center of the deposit area should be to the right front of the spinner axis the chute 50 is disposed somewhat to the right as can be seen from FIG. 14. Also it should be noted that the chute is provided with a curved lower edge portion 78 to better surround the spinner axis indicated by the dot-dash line 82, the axis of the curved portion being offset to one side approximately the same amount that the spinner is offset as best shown in FIG. 14.

Adjustor

It should be noted that while the average granulated fertilizer particles will be discharged in a line that makes an angle of 220° with the line passing through the spinner axis and the deposit point, other materials will be discharged at different angles, the angle being dependent upon the particle movement along the blade surface.

Some of the factors affecting the movement of material along the blade surface are:

(1) The coefficient of friction for the particular material to be discharged. For example, most grains, having a low angle of repose are "slick" and leave the spinner more rapidly than most fertilizers. Similarly, some fertilizers are sticky and leave the spinner more slowly than the average fertilizer.

(2) The shape of the particle to be discharged. Round seeds and pellets tend to roll off the blade faster than do irregular particles such as potassium salt crystals.

(3) The density of the particle to be discharged. Dense particles are affected proportionally less by wind resistance than are lightweight or hollow particles such as pelleted nitrogen fertilizers.

(4) The size of the particle to be discharged. Large particles leave the blade fastener than do small powdery particles. This may be due to a combination of factors such as wind resistance and rolling resistance. To obtain equal lateral motion with respect to the blade surface tiny round particles would have to rotate many times as fast as would large particles.

Thus with those materials which leave the spinner early the pattern of deposit will shift to the left, while with those that leave late the pattern will shift to the right.

For example, applicant has found that barley and rye will be discharged in a line that makes an angle of 207° with the line passing through the spinner axis and the deposit point, wheat and rice at a 203° angle, oats at 198°, and grass seed mixes at 193°: Similarly some powdery materials will be discharged at 228° to 240°.

To compensate for this angular variation the spinner shaft housing 130 is adjustably mounted on the rear of the frame 10 as best shown in FIG. 7. To this end the rear of the frame is provided with four elongated slots 140 and the housing is secured thereto with four fasteners 142. Indicia means 144 are provided on the housing and by positioning the right-hand edge 146 of the housing 130 along the desired indicia mark the spinner can be properly positioned for spreading most materials. It should be noted that this side movement does not adversely affect the action of the V-belt variable speed constant output transmission.

Governor controlled variable speed transmission

As fully brought out above the spinner 18 is designed to operate at 500 r.p.m.'s and to this end a governor controlled variable speed transmission, indicated generally at 48, is provided; the transmission serving to drive the spinner at the preselected speed when the spreader is being moved between 4 and 16 miles per hour.

Figure 4:
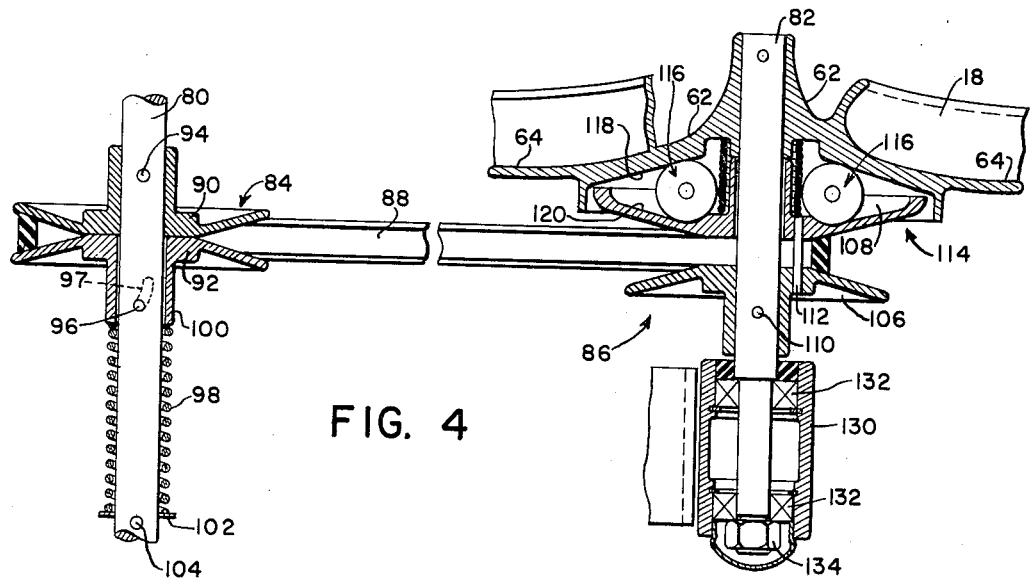
FIG. 4 is a side view of applicant's variable speed transmission with the governing means in the position occupied at low input speeds.
Figure 5:
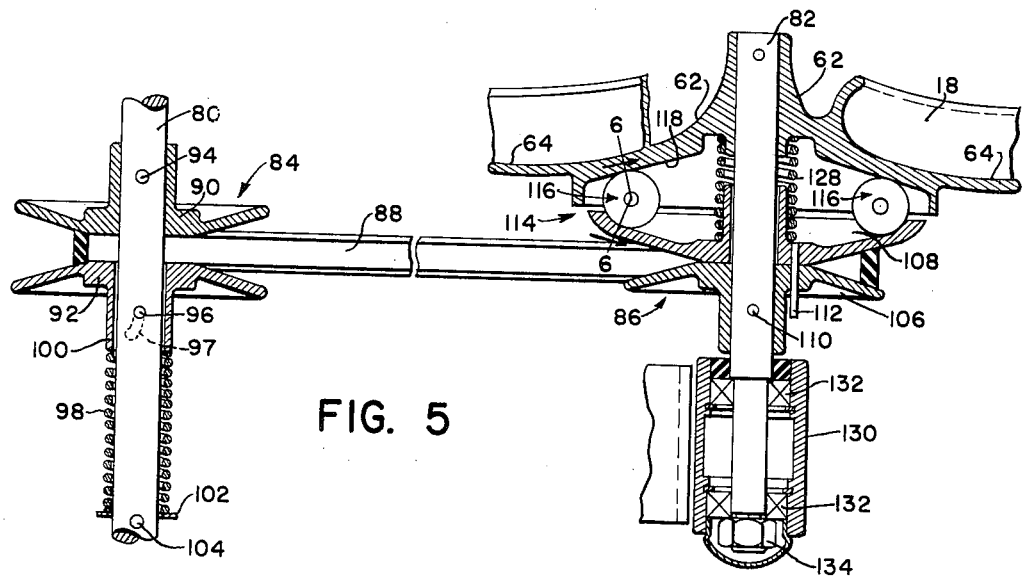
FIG. 5 is a view similar to FIG. 4, the parts being shown in the position occupied at high input speeds.

As best shown in FIGS. 4 and 5 the transmission includes an input shaft 80 and an output shaft 82. As can be seen from FIG. 7 the shafts are disposed at right angles to each other, however in FIGS. 4 and 5 the shafts are illustrated as parallel to each other. However it should be noted that the transmission will work equally as well in either position of the shafts. The input shaft is driven from the wheel 16 in a manner fully set forth elsewhere. A pair of variable sheaves or pulleys 84 and 86 are operatively mounted on the input and output shafts 80 and 82, respectively, and are interconnected by a flexible V-belt 88 operatively disposed thereon.

The sheave 84 is formed as two halves 90 and 92, the sheave half 90 being pinned to the shaft 80 by means of a pin 94, the other sheave half 92 being slidable on the shaft 80. The half 92 is movable relative to the half 90 and is drivingly connected therewith by means of drive pin 96 carried by the shaft 80 and engageable with the angularly disposed slot 97. A spring 98 is adapted to bear against the hub 100 of the sheave half 92, causing the sheave halves 90 and 92 to tightly engage the V-belt 88, the other end of the spring bearing against a washer 102 carried on the shaft 80 by roll pin 104. The pin 96 and slot 97 provide a cam surface which converts a certain fixed portion of the driving torque into axial force to assist the spring 98, therefore preventing belt slippage under high torque loadings.

The driven sheave 86 on the output shaft 82 includes a fixed sheave or pulley half 106 and a movable sheave or pulley half 108. The half 106 is secured to the shaft 82 by means of a pin 110 and the movable half 108 is drivingly connected to the half 106 by means of pins 112 which are fixed to the half 108.

Figure 6:
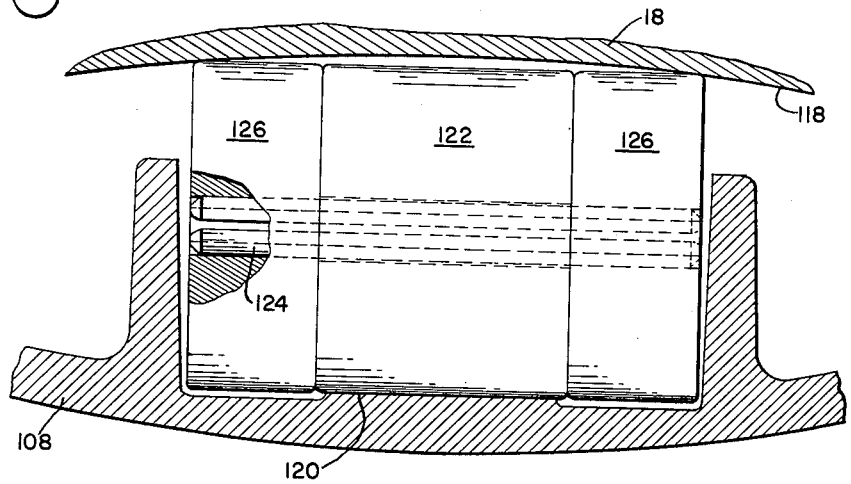
FIG. 6 is an enlarged view taken along the line 6—6 of FIG. 5 showing the details of construction of the governor weight.

The variable axial position of the movable half 108 is automatically controlled by means of a governor, indicated generally at 114 and mounted in cooperative relationship with the spinner 18 and the movable sheave or pulley half 108. The governor 114 includes a plurality of weights 116, preferably four in number, which are disposed between the lower conical surface 118 of the spinner 18 and the track 120 of the sheave half 108. The weights are of a novel construction having an inner roller 122 journaled for free rotation on a roll pin 124, the outer rollers 126 being non-rotatably secured to the pin 124. This construction is best illustrated in FIG. 6.

If cylindrical weights of unitary construction were employed, the weights would actually roll on the surface of one wedge and slide on the surface of the other, depending on which surface has the greatest friction coefficient. At best, there is bound to be a slight lag in the governor action as the input speed is changed when using a solid one piece weight. To eliminate this sluggishness and governor lag, applicant employs the weight described above. This system uses a cone shape on the upper half or spinner half of the governor wedge and four flat pads or tracks 120 extending radially from the center for the lower half or pulley half of the governor wedge. The weights are assembled similar to a rolling pin with handles or outer rollers the same diameter as the inner roller. The very outer edges of the cylindrical surface of the two outer rollers contact the upper cone shaped wedge and the inner roller is free to rotate on the roll pin axis and contacts the lower wedge pad. Thus the inner and outer rollers roll in the opposite directions as the entire weight asembly moves in and out. Thus the only friction remaining is between the roller and the roll pin and this is negligible.

A spring 128 is disposed between the spinner 18 and the half 108. At 500 r.p.m. output, the force of the spring 128, the weight of the rollers 116 and sheave half 108, and the force resulting from the governor weights balance the force exerted by the spring 98, regardless of the input speed between 250 and 1000 r.p.m.

The output shaft 82 is mounted on the spreader frame in a generally conventional fashion, and to this end a housing 130 is provided, the housing having conventional bearings 132 that receive one end of the shaft 82, said end being provided with a nut 134 to hold the shaft within the bearings. The housing 130 is mounted to the rear of the frame in an adjustable manner by fasteners 142 in a manner more fully described elsewhere.

It should be noted that as the weights 116 move axially outwardly the effective belt diameter of the sheave 86 is increased and that of the sheave 84 is decreased.

Clutch construction

Applicant has found that for best results it is necessary to employ a separate conveyor clutch 40 as well as a main throwout clutch 30. Thus when the spreader is transported for long distances or at high speeds the main clutch 30 is disengaged; however when spreading in the fields the main clutch is maintained in its engaged position while the conveyor clutch 40 is employed to control spreading. If only the clutch 30 were employed after disengaging the drive considerable material would dribble from the apron portion of the conveyor onto the spinner during short transport due to bouncing of the machine. Thus, when starting again with the clutch engaged, this collection of material would be thrown off at a short radius and leave streaks of very dense application. This would be disadvantageous in that it could be injurious to both crops and grazing animals as well as resulting in inefficient use of material. The rope operated clutch and throwout assembly 40, which will be described in detail below, is employed to overcome the foregoing disadvantages and to provide a mechanism which can easily be thrown into or out of engagement while the machine is in forward motion to permit leaving a "headland" when fertilizing or seeding, and to control spot applications when desired.

The conveyor throwout clutch assembly 40 is illustrated in FIGS. 17, 18 and 19 and includes a rope controlled cam operated throwout mechanism, indicated generally at 150, for engaging and disengaging the spool clutch, indicated generally at 152, through means of throwout yoke or lever 154 made of spring steel and normally biased inwardly towards the wall member 178.

The spool clutch includes a spool member 156 which is slidably but non-rotatably held on the jackshaft 22 by means of a roll pin 158 which engages a slot 160. The spool 156 is further provided with radially outwardly extending ribs 162 between which the ends 155 of the yoke 154 are disposed. The teeth 164 of spool 156 are adapted to engage the teeth 166 of the sprocket member 168. The member 168 is held rotatably on the shaft 22 by means of a roll pin 170 which engages a groove 172.

The throwout mechanism 150 is composed of a bracket 176 which is secured to a side wall 178 of the spreader in any conventional fashion. The upper and lower outwardly extending portions, 180 and 182, respectively, are apertured, and rotatably receive therein a rod 188. Pinned to the rod is a cam 190 having upper and lower lobes 192 which contact the lever or yoke 154. Disposed between the cam 190 and the upper portion 180 is the throwout arm 194 which is adapted to be controlled by the operator of the spreader through means of a control rope 196. The hub portion of the arm is provided with ratcheting teeth 198 that are adapted to engage teeth 200 on the cam whereby the cam can be indexed 90° at a time.

A spring 202 is disposed between an upturned portion 204 of the lower portion 182 and the yoke 154 and normally aids in holding the yoke in firm engagement with the lobes 192. As can best be seen from FIG. 17 the lobes are generally rectangularly shaped. Thus the teeth 164 and 166 will snap into engagement when the smaller sides 193 are rotated slightly past full or flush engagement with the yoke 154.

A spring 206 is provided to return the arm to its normal position shown in FIG. 17, and stops 208 and 210 are adapted to cooperate with the yoke 154 to limit the swinging movement of the arm 194, stop 208 contacting the lever 154 when the arm 194 is in its rearward position as shown in FIG. 17, and the stop 210 contacting the lever 154 when the arm 194 is in its forward position.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

I claim:

1. A spinner construction comprising: a hub, a plurality of S-shaped blades extending generally radially outwardly from said hub, each of said blades having an inner portion spiraling radially away from said hub in a direction opposite the direction of rotation, a curved outer portion so oriented with respect to the radius line passing from the hub through the tip that the outer portion of the blade lying inwardly of the tip will be behind the radius line with respect to the direction of rotation, and an intermediate portion interconnecting said curved inner and outer portions, all of said portions forming a smooth continuous surface whereby when said spinner is rotating at a substantially constant speed and a particle is dropped near the hub said particle will be relatively uniformly accelerated as it travels outwardly towards the end of the blade.

2. The invention set forth in claim 1 in which the inner portion of each of the blades extends radially outwardly and downwardly, and the outer portion of each of the blades extends radially outwardly and upwardly.

3. A broadcast spreader comprising: a rotatable spinner operable to discharge material deposited on said spinner at varying distances from the spinner depending upon the rotational speed of the spinner, a varying speed drive means, and a governor controlled variable speed transmission, said transmission including a belt, a first variable pulley interconnecting said belt and said drive means, and a second variable pulley and governor assembly interconnecting said belt and said spinner, said assembly comprising a first pulley half fixed relative to said spinner for rotation therewith, a second pulley half cooperable with said first pulley half for engagement with said belt, said second pulley half being movable axially relative to the first pulley half to vary the effective diameter of the pulley halves with respect to engagement with said belt, means operative to drivingly interconnect said second pulley half with said first pulley half, said second pulley half and said spinner defining a space with first and second walls converging towards the periphery of the space, and centrifugal weight means in said space for wedging action against said converging walls to shift said second pulley half away from said spinner to increase the effective belt diameter.

4. The invention set forth in claim 3 in which said first wall is defined by a frusto-conical surface on one of said spinner and said second pulley half, and said second wall means is defined by track means on the other of said spinner and said second pulley half.

5. The invention set forth in claim 3 in which said centrifugal weight means includes outer rollers, axial pin means interconnecting said outer rollers, and an inner roller journaled for rotation on said pin means, said outer rollers contacting only said first wall and said inner roller contacting only said second wall.

6. A broadcast spreader adapted to be propelled forwardly over the ground comprising: a spinner adapted to discharge material in a first arcuate pattern at a distance away from the spinner, said pattern extending to either side of a fore-and-aft line running through said spinner, and means adapted to deposit material on said spinner in a second arcuate pattern near the spinner axis during rotation of said spinner, said second pattern having a configuration generally similar to said first pattern, said means depositing a greater quantity of material in the central area of said second pattern whereby more material is discharged in the central area of said first pattern.

7. A broadcast spreading apparatus including a material hopper and spinner means adapted to discharge material desposited upon said spinner in a predetermined kidney shaped pattern at a distance away from the spinner means, said pattern extending to either side of a fore-and-aft line running through said spinner means, the combination therewith of means to convey the material to be discharged from the material hopper to a terminal portion adjacent said spinner means, said conveying means carrying a uniform depth of material across its width to the point of discharge at its terminal portion, and discharge chute means disposed between the terminal portion of said conveyor means and said spinner means and adapted to funnel material received from the conveyor means onto the spinner means, said discharge chute means having generally upwardly extending side walls disposed between the upper and lower ends, the lower end being arcuate when viewed from above and being of a lesser width than the upper end whereby the material will be deposited upon the spinner in a generally kidney shaped pattern, and gathering fins disposed inwardly of said side walls, the fins including a greater percentage of the width of the chute at the top than at the bottom whereby more material is caused to be discharged on the spinner means near the center of the kidney shaped pattern whereby more material is discharged in the center area of the kidney shaped pattern at a distance away from the spinner.

8. A discharge chute for a material distributing apparatus adapted to be propelled forwardly over the ground comprising: a generally flat member having an upper generally straight edge adapted to be disposed in a direction transverse to the direction of travel of said material distributing apparatus, a lower edge of generally arcuate configuration, the center of curvature of the arcuate edge being disposed below the edge and to one side of a plane normal to and passing through the center of the upper edge, whereby one corner of the lower edge is lower than the other corner, side walls along the opposite side edges of the flat member, said side walls extending outwardly from the surface of the flat member, and gathering fins disposed inwardly of said side walls, said fins extending outwardly from the surface of the flat member and encompassing a greater percentage of linear width at their upper ends than at their lower ends.

9. A broadcast spreader adapted to be propelled forwardly over the ground comprising: a frame, ground-engaging wheel means supporting the frame, a material hopper, a broadcast spinner, means mounting said spinner and said hopper on said frame, means to rotate said spinner at a substantially constant speed when said spreader is being propelled forwardly over the ground, said broadcast spinner having a hub, a plurality of generally S-shaped blades extending generally radially outwardly from said hub, each of said blades having a curved inner portion spiraling radially away from the hub in a direction opposite the direction of rotation, a curved outer portion remote from said hub so oriented with respect to the radius line passing from the hub through the tip that the outer portion of the blade lying inwardly of the tip will be behind the radius line with respect to the direction of rotation, and an intermediate portion interconnecting said curved inner and outer portions, all of said portions forming a smooth continuous surface, and conveying means operatively associated with said hopper and adapted to convey material onto a predetermined area of the spinner near the hub whereby that portion of the S-shaped blade which spirals radially away from the hub initially moves the material on the spinner.

10. The invention set forth in claim 9 in which said conveyor means includes a discharge chute having a generally flat member having an upper generally straight edge, a lower edge of generally arcuate configuration, the center of curvature of the arcuate edge being disposed below the edge and to one side of a plane normal to and passing through the center of the upper edge, whereby one corner of the lower edge is lower than the other corner, side walls along the opposite side edges of the flat member, said side walls extending outwardly from the surface of the flat member, and gathering fins disposed inwardly of said side walls, said fins extending outwardly from the surface of the flat member and encompassing a greater percentage of linear width at their upper ends than at their lower ends.

11. The invention set forth in claim 9 in which the curved outer portion has a radius of curvature greater than the radius of curvature of the inner portion.

12. A broadcast spreader adapted to be propelled over the ground comprising: a frame, a material carrying hopper mounted on said frame, ground-engaging wheel means supporting said frame, a rotatable spinner operable to discharge material deposited upon said spinner at varying distances depending upon the rotational speed of the spinner, spinner support means mounted on said frame to the rear of said hopper and extending upwardly to said spinner conveying means mounted between said hopper and said spinner and adapted to convey material from said hopper onto said rotatable spinner, means operatively connected with said conveyor to drive said conveyor means, and further means operatively interconnecting said rotatable spinner with said ground-engaging wheel means whereby said spinner is caused to rotate in response to forward movement of said spreader, said last-mentioned means including an input shaft driven by said wheel, a governor controlled variable speed transmission below said spinner and extending between said spinner support means and said input shaft, the parts being so arranged and constructed that said spinner will be driven at a relatively constant speed in response to varying rotational speeds of said conveyor drive means, said governor controlled variable speed transmission including a belt drive in which a flexible belt interconnects variable sheaves mounted on said input shaft and said spinner support means.

13. The invention set forth in claim 12 in which said governor is associated with the variable sheave on the spinner support means and varies the effective diameter of said last-mentioned sheave by a wedging action.

14. The invention set forth in claim 12 in which said conveyor drive means is operatively interconnected with the ground-engaging wheel means in such a manner that the material conveyed to the spinner is proportional to the forward speed of said spreader.

15. A broadcast spreader comprising: a rotatable spinner operable to discharge material deposited upon said spinner at varying distances from the spinner depending upon the rotational speed of the spinner, rotatable shaft means upon which said spinner is non-rotatably secured, drive shaft means operable at different rotational speeds, and a governor controlled variable speed transmission interconnecting said shafts, said transmission including a belt, first and second variable pulleys mounted on said shafts and operatively interconnected by said belt, each of said pulleys having a first pulley half fixed to its associated shaft for rotation therewith and a second pulley half cooperable with said first pulley half for engagement with said belt, said second pulley half being movable axially relative to the associated first pulley half to vary the effective diameter of the pulley halves with respect to engagement with the belt, and governor means cooperable with one of the second pulley halves, said governor means including opposed generally conical outwardly converging surfaces of which one is movable axially relative to the shaft with said second pulley half, and centrifugal weight means disposed between said opposed surfaces and operable to vary the effective diameter of the pulley halves by wedging action.

16. Drive means for a broadcast spreader having a frame, ground-engaging wheel means supporting said frame, a topper mounted on said frame, a broadcast spinner mounted on said frame, and conveying means operatively associated with said hopper and adapted to convey material to said broadcast spinner, the combination therewith of means operable to drive the conveying means and the spinner in response to forward movement of the spreader comprising: first rotatable means operatively interconnected with said ground-engaging wheel means, second rotatable means, first clutch means operable to selectively engage said second rotatable means with said first rotatable means whereby said second rotatable means may be rotated in response to rotation of said first rotatable means when said clutch is engaged, third rotatable means, second clutch means operable to selectively engage said third rotatable means with said second rotatable means whereby said third rotatable means may be rotated in response to rotation of said second rotatable means when said second clutch is engaged, means interconnecting said second rotatable means and said spinner whereby said spinner is caused to rotate in response to rotation of said second rotatable means, said last interconnecting means including a governor controlled variable speed transmission, and means interconnecting said third rotatable means with said conveying means whereby said conveying means is caused to rotate in response to rotation of said second rotatable means.

References Cited by the Examiner
UNITED STATES PATENTS

| | | | |
|---|---|---|---|
| 1,098,603 | 6/1914 | Weigel | 275—15 |
| 1,769,302 | 7/1930 | MacGregor | 275—8 |
| 1,880,155 | 9/1932 | Ruth | 275—8 |
| 2,162,689 | 6/1939 | Mayfield | 275—8 |
| 2,177,052 | 10/1939 | Blough | 192—99 |
| 2,538,886 | 1/1951 | Skibbe et al. | 275—8 |
| 2,739,685 | 3/1956 | Paulavich | 192—99 |
| 2,766,991 | 10/1956 | Burghardt | 275—8 |
| 2,856,191 | 10/1958 | Kolb | 275—15 X |
| 2,989,314 | 6/1961 | Larson | 275—8 |
| 3,041,076 | 6/1962 | Van der Lely et al. | 275—8 |
| 3,085,807 | 4/1963 | Tyler | 275—8 |

FOREIGN PATENTS

| | | |
|---|---|---|
| 200,539 | 12/1955 | Australia. |
| 660,465 | 2/1929 | France. |
| 839,125 | 5/1952 | Germany. |
| 523,589 | 4/1955 | Italy. |

ABRAHAM G. STONE, *Primary Examiner.*

WILLIAM A. SMITH, III, *Assistant Examiner.*